(12) United States Patent
Babine et al.

(10) Patent No.: US 8,036,371 B2
(45) Date of Patent: Oct. 11, 2011

(54) UTILIZING SMALL GROUP CALL CENTER AGENTS TO IMPROVE PRODUCTIVITY WITHOUT IMPACTING SERVICE LEVEL TARGETS

(75) Inventors: Brigite M. Babine, Lewiston, ME (US); Robin H. Foster, Little Silver, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1585 days.

(21) Appl. No.: 11/293,908

(22) Filed: Dec. 5, 2005

(65) Prior Publication Data

US 2007/0129996 A1    Jun. 7, 2007

(51) Int. Cl.
*H04M 5/00* (2006.01)
(52) U.S. Cl. .................. 379/265.1; 379/265.01
(58) Field of Classification Search ............. 379/265.01–265.14, 266.01–266.1, 379/309
See application file for complete search history.

(56) References Cited

U.S. PATENT DOCUMENTS

| | | | | |
|---|---|---|---|---|
| 5,519,773 | A * | 5/1996 | Dumas et al. | 379/265.05 |
| 5,706,516 | A * | 1/1998 | Chang et al. | 719/314 |
| 5,978,465 | A * | 11/1999 | Corduroy et al. | 379/265.02 |
| 6,061,347 | A * | 5/2000 | Hollatz et al. | 370/352 |
| 6,353,667 | B1 | 3/2002 | Foster et al. | |
| 6,356,632 | B1 | 3/2002 | Foster et al. | |
| 6,366,666 | B2 | 4/2002 | Bengtson et al. | |
| 6,389,400 | B1 * | 5/2002 | Bushey et al. | 705/7 |
| 6,535,600 | B1 * | 3/2003 | Fisher et al. | 379/265.12 |
| 6,535,601 | B1 | 3/2003 | Flockhart et al. | |
| 6,563,920 | B1 | 5/2003 | Flockhart et al. | |
| 6,614,903 | B1 | 9/2003 | Flockhart et al. | |
| 6,633,640 | B1 | 10/2003 | Cohen et al. | |
| 6,661,889 | B1 | 12/2003 | Flockhart et al. | |
| 6,704,765 | B1 * | 3/2004 | Chang et al. | 718/102 |
| 6,732,188 | B1 | 5/2004 | Flockhart et al. | |
| 6,741,698 | B1 * | 5/2004 | Jensen | 379/265.02 |
| 6,760,428 | B2 | 7/2004 | Foster | |
| 6,856,680 | B2 * | 2/2005 | Mengshoel et al. | 379/265.06 |
| 6,925,165 | B2 | 8/2005 | Cohen et al. | |
| 6,973,176 | B1 * | 12/2005 | Chism et al. | 379/265.12 |
| 7,072,966 | B1 * | 7/2006 | Benjamin et al. | 709/228 |
| 2002/0060988 | A1 * | 5/2002 | Shtivelman | 370/259 |
| 2002/0169820 | A1 * | 11/2002 | Sayan et al. | 709/203 |
| 2003/0081757 | A1 * | 5/2003 | Mengshoel et al. | 379/265.06 |

* cited by examiner

*Primary Examiner* — William Deane, Jr.
(74) *Attorney, Agent, or Firm* — Chapin IP Law, LLC; David W. Rouille, Esq.

(57) ABSTRACT

In a call center, a plurality of agents comprises at least a first group associated with a first skill and a second group associated with a second skill. The second group may have a substantially larger number of agents than the first group, and accordingly the first and second groups may be referred to as small and large groups, respectively, and the first and second skills may be referred to as small and large skills, respectively. In one embodiment, if a service level target for the small skill is being met, and a number of available agents in the small group exceeds a specified minimum available agent requirement, at least one of the available agents in the small group is selected and designated as eligible for handling a communication involving the large skill, without assigning that agent to the large group or removing that agent from the small group.

21 Claims, 3 Drawing Sheets

UTILIZING SMALL GROUP CALL CENTER AGENTS TO IMPROVE PRODUCTIVITY WITHOUT IMPACTING SERVICE LEVEL TARGETS

FIELD OF THE INVENTION

The invention relates generally to call centers or other call processing systems in which voice calls, e-mails, faxes, voice messages, text messages, Internet service requests or other types of communications are distributed among a number of service agents for handling.

BACKGROUND OF THE INVENTION

Call centers distribute calls and other types of communications to available service agents in accordance with various criteria. Call center agents are often grouped based on the skills of those agents in handling communications. Depending upon the needs associated with the particular skill, there may be a large number of agents in the skill group, or a small number of agents in the skill group. The latter are called small skill groups, and their associated agents are called small group agents. Such small skill groups may each typically contain on the order of two to ten agents, although other numbers are possible. As expected, a given large skill group typically comprises a substantially larger number of agents than a given small skill group, but the actual number in a particular group can vary depending upon factors such as the total number of agents in the call center. For example, in a call center with thousands of agents, a given small skill group may comprise a larger number of agents than a similar small skill group in a call center with only twenty agents. Thus, the terms "small group" and "large group" as used herein should be understood as relative terms, with the small group comprising a substantially lower number of agents than the large group. Of course, there may be multiple small groups and multiple large groups in a given call center, and a given agent can be a member of one or more small groups as well as one or more large groups.

A problem that arises in call centers with small skill groups is that the small group agents are often either underutilized or overutilized. Underutilization occurs when there are unduly restrictive barriers to using the small group agents to handle large group calls. Underutilization results in low occupancy and low productivity for the small group agents, and thus a higher cost per transaction for these small group agents. Overutilization occurs when the barriers to using the small group agents to handle large group calls are too easy to overcome. Overutilization results in high occupancy for the small group agents and poor service levels for the kinds of contacts that only the small group agents handle.

Conventional techniques for dealing with this situation may involve, for example, conditional queuing checks, multi-queuing, reserve agents, skill preference levels, and manual changing of agent skill settings. However, these and other conventional techniques fail to provide optimum usage of small group agents while avoiding any significant impact to service level targets or other performance objectives of the call center. More particularly, these existing solutions would generally cause either an overutilization or an underutilization of small agent groups, gaining productivity at the cost of poor service levels, or producing required service levels with poor productivity.

Accordingly, it is apparent that a need exists for improved techniques for handling small group agents in a call center.

SUMMARY OF THE INVENTION

The invention provides methods and apparatus which improve the processing of calls or other communications in a call center. More particularly, the invention in an illustrative embodiment provides techniques for better utilizing small group call center agents so as to improve productivity without impacting service level targets.

In accordance with one aspect of the invention, a plurality of call center agents comprises at least a first group associated with a first skill and a second group associated with a second skill. The second group may have a substantially larger number of agents than the first group, and accordingly the first and second groups may be referred to as small and large groups, respectively, and the first and second skills may be referred to as small and large skills, respectively. If a service level target for the small skill is being met, and a number of available agents in the small group exceeds a specified minimum available agent requirement, at least one of the available agents in the small group is selected and designated as eligible for handling a communication involving the large skill, without assigning that agent to the large group or removing that agent from the small group.

It should be noted that one or more of the agents can hold multiple small skills and may be designated as eligible for handling communications associated with multiple large skills. For example, a given one of the plurality of agents may have a plurality of small skills including the first skill and one or more additional small skills. The given agent may also be designated as eligible for handling a communication involving any of a plurality of large skills including the second skill and one or more additional large skills.

The agent designated as eligible for handling a communication involving the large skill may be given priority over one or more of the agents in the second group in a selection process which determines a particular agent to handle the communication. This will increase the likelihood that the small group agent designated as eligible to handle a large skill communication will actually be selected to handle such a communication.

In the illustrative embodiment, the determination as to whether the number of available agents in the small group exceeds a specified minimum available agent requirement may be based on a headcount rule, which involves determining if the number of available agents in the small group is at least one more than a specified minimum number of available agents. As another example, the determination may be based on a percentage rule, which involves determining if a given available agent represents more than a specified percentage of the total number of available agents in the small group. As yet another example, the determination may be based on another type of percentage rule, which involves determining if the number of available agents in the first group represents more than a specified percentage of the total number of agents in the first group. Numerous other types of rules may be used.

The available agent from the small group that is selected and designated as eligible for handling a communication involving the large skill may be the particular agent having the lowest occupancy of the available agents of the small group. Other selection techniques, such as most idle agent, proficiency at the small skill, proficiency at the large skill, or combinations of these and other techniques, may be used to select among the available agents of the small group.

If a given available agent is a member of multiple small groups, that agent cannot be designated as eligible for handling a communication involving the large skill unless service level targets are being met for all of the multiple small groups and numbers of available agents in the multiple small groups exceed respective specified minimum available agent requirements for those small groups.

The illustrative embodiments provide a number of significant advantages over conventional techniques. For example, the described techniques give call centers the ability to utilize smaller pools of agents more productively while still maintaining service level targets for smaller volume skills. This allows the small skill agents to handle more communications, thereby making them more productive.

These and other features and advantages of the present invention will become more apparent from the accompanying drawings and the following detailed description.

DETAILED DESCRIPTION OF THE INVENTION

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks, Internet Protocol (IP) networks, etc. The term "call center" as used herein is thus intended to include any type of ACD system, telemarketing system or other communication system which processes calls or other service requests, including voice calls, video calls, multimedia calls, e-mail, faxes, text chat or voice messages as well as various portions or combinations of these and other types of communications. The term "call" as used herein is intended to include any of the above-noted types of communications as well as portions or combinations of these and other communications.

Figure 1:
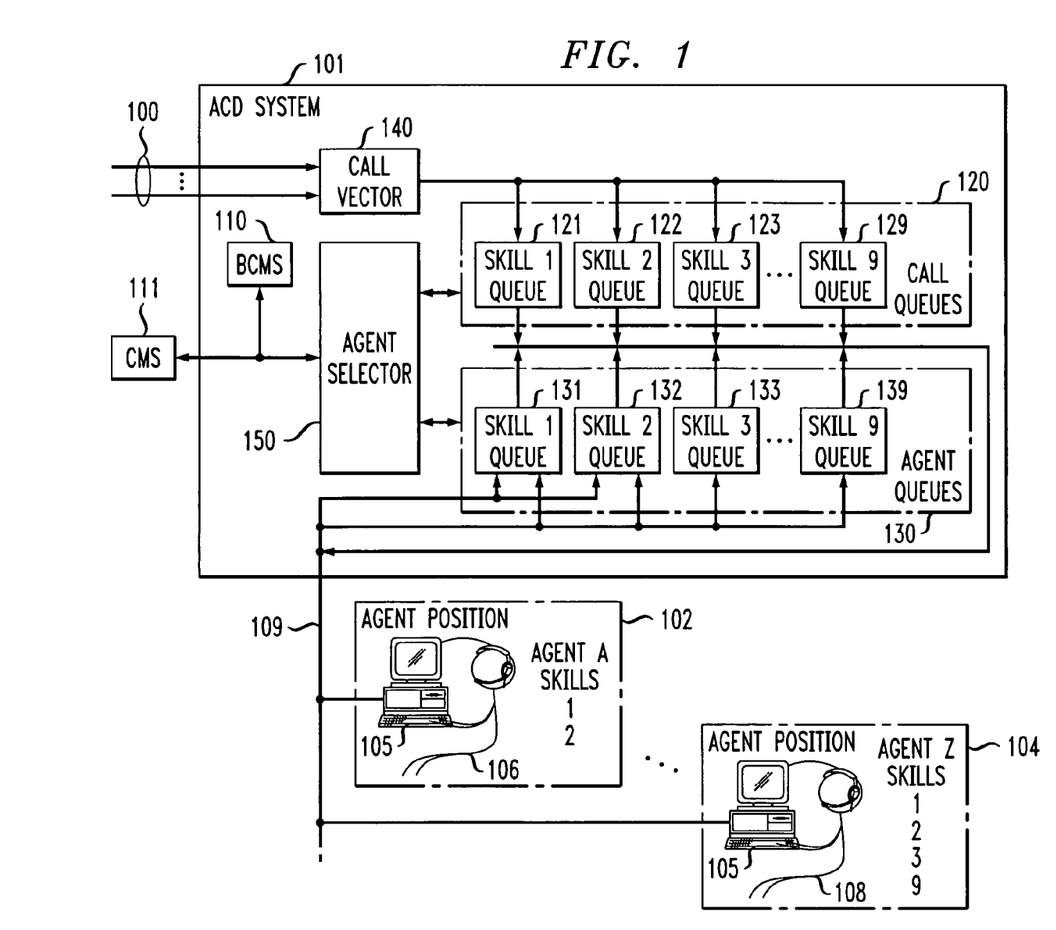
FIG. 1 is a block diagram of a call center in which one or more aspects of the present invention may be implemented.

FIG. 1 shows an illustrative call center in which the present invention may be implemented. The call center includes a number of telephone lines and/or trunks 100 selectively interconnected with a plurality of agent positions 102-104 via an ACD system 101. Each agent position 102-104 includes a voice-and-data terminal 105 for use by a corresponding agent 106-108 in handling calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101. The ACD system 101 may be, for example, a PBX-based ACD system, or other type of ACD system. It should be understood, however, that the invention does not require the use of an ACD system or any other particular call processing hardware, software or firmware configuration.

Figure 2:
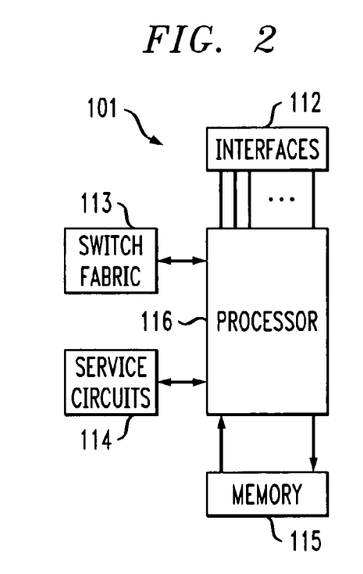
FIG. 2 is a block diagram of an automatic call distribution (ACD) system implemented in the call center of FIG. 1.

FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various portions or combinations thereof) for executing the stored control programs to control the interfaces and the fabric, to provide automatic call distribution functionality, and to provide storage of e-mails, faxes and other communications.

Referring again to FIG. 1, exemplary data elements stored in the memory 115 of ACD system 101 include a set of call queues 120 and a set of agent queues 130. Each call queue 121-129 in the set of call queues 120 corresponds to a different agent skill, as does each agent queue 131-139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill.

It should be noted that the invention can also be implemented in systems using a wide variety of other types of queue arrangements and queuing techniques. Moreover, the particular number and arrangement of agent positions, queues and other elements of the FIG. 1 system are merely exemplary, and may vary depending upon the needs of a given implementation.

The ACD system 101 further includes a call vector 140. The call vector 140 may be one of a number of different types of stored control programs implemented in system 101. Conventional aspects of call vectoring are well known and therefore not described in detail herein. Calls incoming to the call center on lines or trunks 100 are assigned by call vector 140 to different call queues 121-129 based upon the agent skill that they require for proper handling. Agents 106-108 who are available for handling calls are assigned to agent queues 131-139 based upon the skills which they possess.

An agent may have multiple skills, and hence may be assigned to multiple agent queues 131-139 simultaneously. Such an agent is referred to herein as a "multi-skill agent." Furthermore, an agent may have different levels of skill expertise (e.g., different skill levels in a multi-level scale or primary and secondary skills), and hence may be assigned to different agent queues 131-139 at different expertise levels. Skills-based ACD techniques are described in greater detail in, for example, U.S. Pat. No. 5,206,903 issued Apr. 27, 1993 in the name of inventors J. E. Kohler et al. and entitled "Automatic Call Distribution Based on Matching Required Skills with Agents Skills," which is commonly assigned herewith and incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system.

Further details regarding call processing in a system such as ACD system 101 can be found in, for example, U.S. Pat. No. 5,905,793, issued May 18, 1999 in the name of inventors A. D. Flockhart et al. and entitled "Waiting-Call Selection Based on Anticipated Wait Times," U.S. Pat. No. 6,192,122, issued Feb. 20, 2001 in the name of inventors A. D. Flockhart et al. and entitled "Call Center Agent Selection that Optimizes Call Wait Times," and U.S. Pat. No. 6,614,903, issued Sep. 2, 2003 in the name of inventors A. D. Flockhart et al. and entitled "Methods and Apparatus for Service State-Based Processing of Communications in a Call Center," all of which are commonly assigned herewith and incorporated by reference herein.

The system 100 may include additional elements not explicitly shown in the figure, such as routers, gateways or other network elements. The system may also or alternatively include one or more communication system switches, such as a DEFINITY® Enterprise Communication Service (ECS) communication system switch available from Avaya Inc. of Basking Ridge, N.J., USA. Another example call processing switch suitable for use in conjunction with the present invention is the MultiVantage™ communication system switch, also available from Avaya Inc. Various elements of the FIG. 1 system may be implemented using known elements of these and other conventional switches, or portions or combinations of such switch elements.

In accordance with an aspect of the present invention, the call center of FIG. 1 is configured to include capabilities for utilizing small group call center agents to improve productivity without impacting service level targets. This aspect of the present invention will be described in greater detail below, with reference to the flow diagrams of FIGS. 3 and 4.

In an illustrative embodiment, a mechanism is provided to increase the occupancy of the small group agents by allowing them handle large group calls based on agent surplus conditions of the small group. Advantageously, productivity of otherwise idle agents from a small skill group is enhanced while maintaining service level targets for the small skill.

If the large group is in an agent surplus situation, conventional triggers, such as number of calls in queue or expected wait time (EWT) for the large group queue, will not result in any large group calls going to the small group. Under this circumstance it may be desirable to temporarily have the small group agents also take the large group calls as long as the small skill's service level target is being met and the work would not overly deplete the "surplus" population of small group agents, that is, the number of small group agents that are not presently occupied and are thus available for assignment.

If the large group is in a call surplus situation, the above-noted conventional triggers could result in small group agents handling large group calls. These conventional triggers do not consider the small group service level achievement or the depletion of the small group agent surplus.

If the large group is in a call surplus situation but no triggers have indicated the need for small group agent assistance, the small group will continue with low occupancy and productivity. In this situation what is needed is a trigger that will permit a small group agent to take a large group call if the small group service level achievement is adequate, if the small group agent's occupancy is below a threshold and if use of that agent would not deplete the small group agent surplus below a designated level.

The illustrative embodiment provides a number of techniques for evaluating whether using a small group agent to handle a large group call would deplete the surplus population of small group agents.

As one example, a headcount rule may be used, which states that a small group agent may be used only if there will still be at least X surplus small group agents remaining. As a more particular illustration of this rule, if X=2, a surplus small group agent cannot be used to handle the large group call unless there are three or more surplus small group agents. Similarly, if X=3, a surplus small group agent could be used to handle a large group call only if the population of surplus agents is four or more. Such a headcount rule should also take into account depletion of all the designated small skills a given agent holds. In addition, the rule may also provide a way of checking the small group agents one-by-one in a particular order, perhaps of lowest occupancy to highest occupancy until one has been found or until all agents have been ruled out.

It should be noted that, in a typical implementation, a given skill must be designated as warranting the protections associated with small group status. Such designation may be based on factors like time of day, day of week, holiday, etc. The designation of small skills may be updated periodically, for example, every half-hour, every hour, etc. The system may be configured to provide, on request or in accordance with a schedule, an analysis indicating which skills should be designated as small skills.

Another exemplary trigger in accordance with the invention is based on a percentage rule. This rule specifies that a small group surplus agent may be used to handle a large group call if that small group surplus agent does not represent any more than Y % of the total number of surplus small group agents. For example, if Y %=24%, and there are four surplus agents in the small group, none can be used to handle a large group call because one agent represents 25% of the surplus and 25% is greater than 24%. However, if Y %=32%, one of the four surplus small group agents can be used because 25% is less than 32%. As another example, if Y %=32%, and there are three surplus agents in the small group, none can be used to handle a large group call because one agent represents 33% of the surplus and 33%>32%.

Yet another example of a trigger is one based on a different type of percentage rule, which specifies that a small group surplus agent may be used to handle a large group call if the number of small group surplus agents represents more than Z % of the total number of small group agents. Thus, if Z %=20%, and there are ten agents in the small group, with three of the ten being surplus agents, one of the surplus agents may be used to handle a large group call.

A simple decision tree can be used to evaluate what should happen when an agent with a small skill becomes available. Initially, the usual call selection process may be performed for that agent. If the agent does not have a small skill call in queue to work on, the new evaluation can proceed as follows. First, a check is made of the condition of the small group service level. If the service level of the small group is below target, the surplus agent cannot be "borrowed" to handle the large skill call. If the service level of the small group is at or above target, a check is then made to see if the small group has enough surplus agents in accordance with the headcount or percentage rule described above. As an example, a determination is made as to whether or not the number of surplus agents in the small group is currently greater than or equal to X, based on the headcount rule. The threshold X can be administered as part of the hunt group form for the small skill, for example, using a static definition or variable based on time of day, day of week, holiday, number of agents staffed, or other factor(s), as will be appreciated by those skilled in the art. The service level target, like the above-noted values X or Y associated with the respective headcount or percentage rules, may be administered on an otherwise conventional hunt group form.

If a given agent holds multiple small skills, the above decision process is repeated for each of these small skills. If a negative result is found for any of the small skills held by the given agent, the process is halted and that agent cannot be used to handle the large group call. Otherwise, the given agent can be borrowed.

Figure 3:
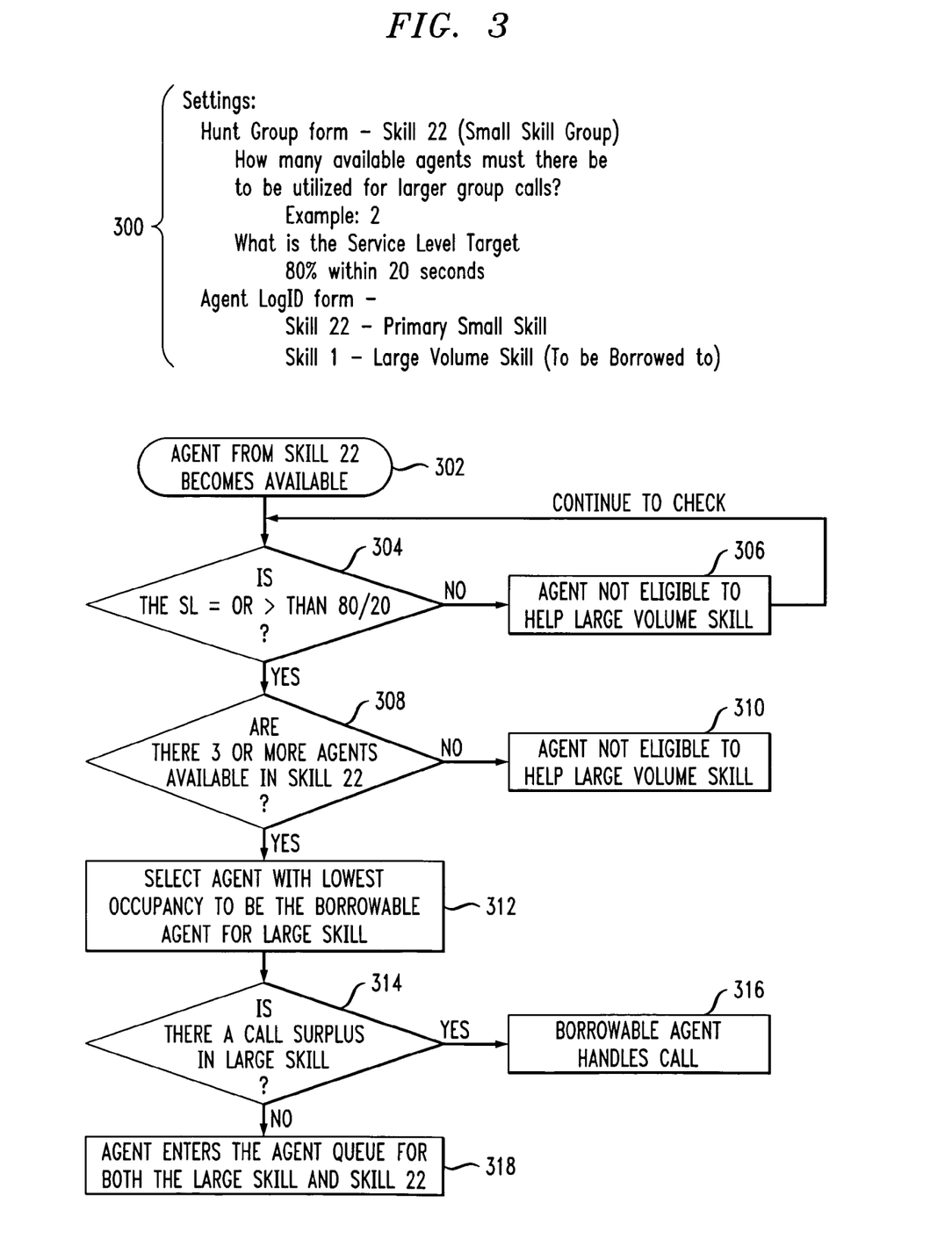
FIGS. 3 and 4 are flow diagrams showing examples of the use of small group agents to improve call center productivity in an illustrative embodiment of the invention.

Referring now to the flow diagram of FIG. 3, an example is shown involving settings 300. In these settings, the hunt group form designates Skill 22 as a small skill having an associated small skill group. In this example, the headcount rule is utilized, and the threshold X is set to two. The hunt group form similarly indicates that the service level target is an 80/20 target, that is, 80% of the calls requiring Skill 22 must be serviced within 20 seconds. Also within the settings 300, an agent login form for a given agent specifies Skill 22 as the primary small skill for that agent, and further specifies Skill 1 as a large skill, more specifically referred to as a large volume skill in this example, for which the given agent may be borrowed.

In step 302, an agent from Skill 22 becomes available. That is, the agent becomes a surplus agent for the small skill group for Skill 22.

In step 304, a check is made as to whether or not the current service level for Skill 22 is equal to or greater than the 80/20 service level target for Skill 22.

If the current service level is not equal to or greater than the service level target, the agent is not eligible to help with the large volume skill (Skill 1) as indicated in step 306, and hence cannot be borrowed to handle a call requiring the large volume skill. The process then returns to step 304 so that additional checks can be made periodically to determine if conditions have changed.

If step 304 determines that the current service level is equal to or greater than the service level target, the process moves to step 308, where a determination is made as whether the total number of surplus agents in the small skill group for Skill 22 is at least one more than the specified minimum threshold X, or at least three surplus agents in this example. If not, there are insufficient surplus agents, and the agent is not eligible to help with the large volume skill, as indicated in step 310.

Although not shown in the figure, there may be feedback from step 310 to step 304, so that the surplus agent determination of step 308, if producing a negative result, can be periodically repeated, like the service level determination of step 304.

Thus, if the agent that becomes available cannot be borrowed, that agent may be placed into a pool of available agents. Whenever the service level changes significantly or another agent is added to the available pool, the process steps 304 and 308 can be repeated to determine which of the available agents, if any, can be borrowed.

If the total number of surplus agents in the small skill group for Skill 22 is at least one more than the specified minimum threshold X, that is, if there are three or more surplus agents for Skill 22, the surplus agent with the lowest occupancy is selected to be the "borrowable" agent for the large skill, as indicated in step 312. The borrowable agent in this example is selected using a least occupied agent (LOA) selection technique, but other techniques could be used, such as most idle agent (MIA), a selection based on skill proficiency, etc. With regard to selection based on skill proficiency, it may be desirable to select the surplus agent with the lowest small skill proficiency, so as to share the most expendable surplus agent with the large skill group, or to select the surplus agent with the highest large skill proficiency, so as to share the best available surplus agent for the large skill. The particular selection mechanism used will therefore vary based on the particular call processing goals of a given implementation.

It is therefore apparent that the selection of a given surplus agent for designation as a borrowable agent could be based, for example, on occupancy levels of the surplus agents, idle times of the surplus agents, or proficiencies of the surplus agents at the small or large skills, or various combinations of these and other selection criteria.

In a given embodiment, the particular selection technique used may be based on the hunt group type of the large skill. For example, if the large skill's hunt group type is LOA, the borrowable agent may be selected using LOA, but if the large skill's hunt group type is MIA, the borrowable agent may be selected using MIA. The point in such an arrangement is to select the small skill agent that has the greatest chance in competing with large group agents to get a large group call. If calls are in the queue for the large skill, a selection among borrowable agents according to LOA would increase productivity for the person who likely needs it most. Using the LOA technique would also help create equal occupancy levels among the small skill agents.

Returning to the figure, step 314 determines if there is a call surplus in the large skill, that is, if there are more calls waiting in queue than there are agents available to service the calls. If so, the borrowable small group agent as determined in step 312 is used to handle a call, as indicated in step 316. Otherwise, the borrowable agent determined in step 312 enters the agent queue(s) for both the large skill (Skill 1) and the small skill (Skill 22), as indicated in step 318. In this case, the small group borrowable agent joins with one or more available large and/or small group agents. When a large group call arrives, normal agent selection will begin and will consider this borrowable agent as a regular large skill agent for the time being. The borrowable agent may or may not be the one chosen. For example, use of an LOA technique in agent selection in step 318 would increase the chance of this agent being the one used and is the preferred method for this particular example. An MIA technique would put this borrowable agent at the end of the agent queue and reduce the chance of usage of that agent, but nonetheless could also be applied.

It is possible that, after a given small group agent has been placed in the large skill queue in step 318, another small group agent becomes available and is also determined to be borrowable. If this other agent has a lower occupancy than the first agent, the new agent with the lower occupancy should replace the first agent in the large skill queue.

In a given embodiment, an otherwise conventional agent selection process may be altered such that it is biased toward using the borrowable agents. This will avoid a situation in which the borrowable agents remain idle while large skill agents are assigned calls. One type of bias toward use of borrowable agents to handle large skill calls is reflected in steps 314 and 316 of the FIG. 3 example, in the immediate use of the borrowable agent to handle a call in a large skill call surplus situation. However, the agent selection process in step 318 may also be biased toward use of the borrowed agents. For example, the borrowable agent may be used automatically for the next available call, or the use of borrowable and large skill agents may be alternated as long as borrowable agents are available. Numerous other techniques for biasing a given call selection process toward using borrowable agents to handle large skill calls will be apparent to those skilled in the art.

As indicated above, a given agent template in a call center of the illustrative embodiment may specify one or more small skills, one or more traditional large skills that the agent serves, one or more large skills that the agent can be borrowed to, as well as other types of skills, such as reserve skills.

A given agent may thus have multiple small skills and may be designated as borrowable for multiple large skills. Since there may be many more than two skills in the call center, and more than two possible skills per agent, there are numerous permutations of the manner in which skills are assigned an agent. Examples of such permutations are given in the following list:

A) Small skill assigned as reserve—agent helps only when small skill is in trouble B) Small skill assigned as primary—agent works only on small skill C) Small skill assigned as primary, large skill as borrowable—agent will help on the large skill as long as the small skill has acceptable service level and work would not deplete the small group available agents below a designated level D) Small skill assigned as primary, large skill assigned as reserve—agent helps out when large skill needs help E) Small skill and large skill assigned as primary—agent handles each type of call routinely F) Large skill assigned as primary and small skill assigned as reserve—agent helps out the small skill group when needed G) Large skill assigned as primary—agent handles only large skill calls H) Large skill assigned as reserve—agent handles large skill calls only when large skill group needs help One possible example of an agent template specifying assignment of skills is as follows:

Example of Agent Template

| Skill 1  | P    | Lvl 1 |
| Skill 11 | UP   | Lvl 1 |
| Skill 2  | Brw  | Lvl 3 |
| Skill 3  | Brw  | Lvl 1 |
| Skill 4  | Rsrv | Lvl 1 |

Figure 4:
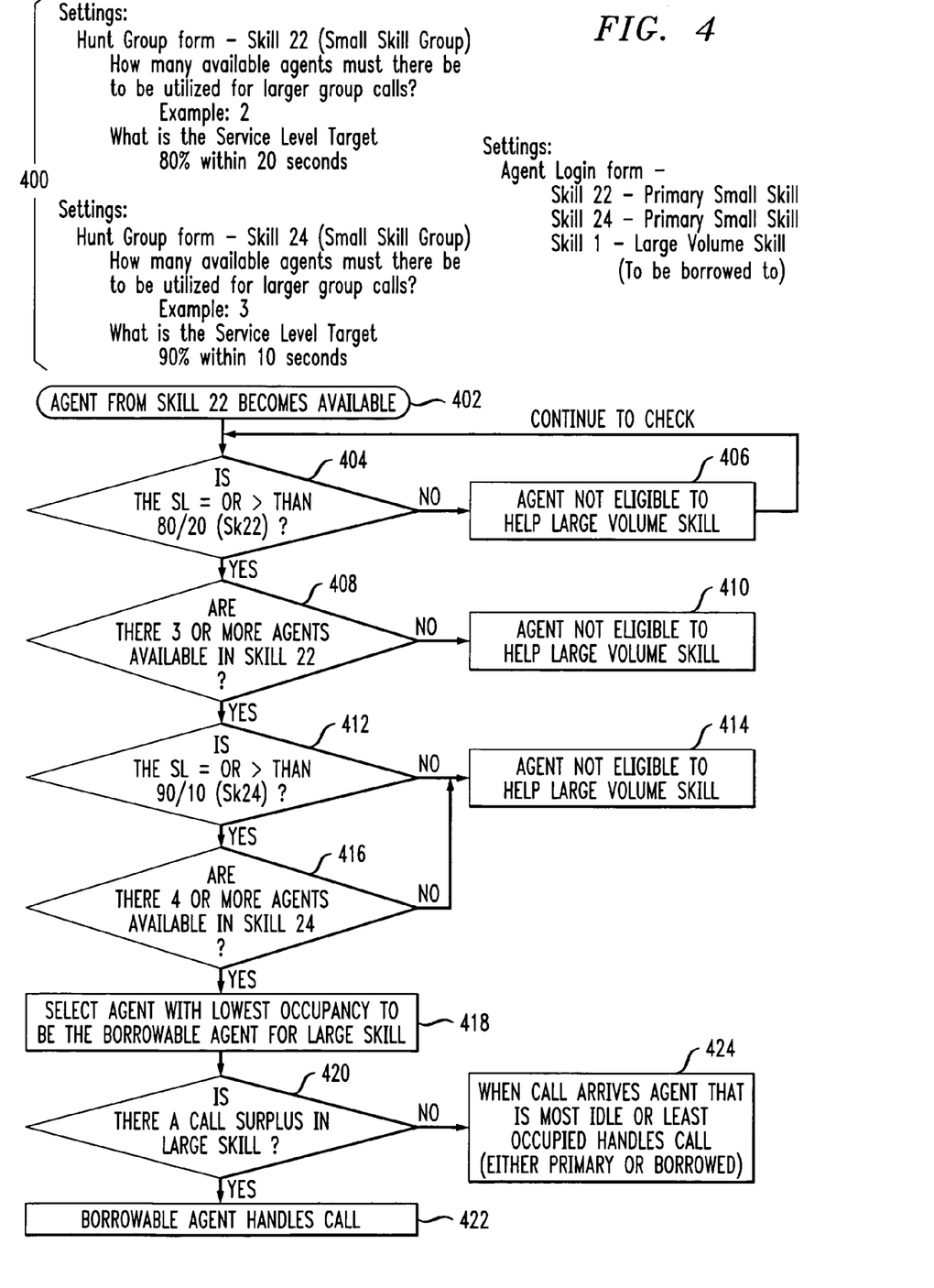

In this example, P denotes a "protected" skill, that is, one which is protected by processing operations such as those described in conjunction with FIG. 3 or 4, UP denotes an unprotected skill, Brw denotes borrowable to that skill, and Rsrv denotes reserve to that skill.

FIG. 4 shows another example of the utilization of small group agents to improve productivity without impacting service level targets. In this example, settings 400 include a hunt group form for a first small skill, Skill 22, and a hunt group form for a second small skill, Skill 24. The hunt group form for Skill 22 designates an X value of two, and a service level target of 80/20, just as in the FIG. 3 example. The hunt group form for Skill 24 designates an X value of three, and a service level target of 90/10, that is, 90% of the calls requiring Skill 24 must be serviced within 10 seconds. The settings 400 further include an agent login form for a given agent. The agent login form specifies Skill 22 and Skill 24 as primary small skills for that agent, and further specifies Skill 1 as a large skill, also referred to as a large volume skill in this example, for which the given agent may be borrowed.

In step 402, an agent from Skill 22 becomes available. That is, the agent becomes a surplus agent for the small skill group for Skill 22.

In step 404, a check is made as to whether or not the current service level for Skill 22 is equal to or greater than the 80/20 service level target for Skill 22.

If the current service level for Skill 22 is not equal to or greater than the 80/20 service level target, the agent is not eligible to help with the large volume skill (Skill 1) as indicated in step 406, and hence cannot be borrowed to handle a call requiring the large volume skill. The process then returns to step 404 so that additional checks can be made periodically to determine if conditions have changed.

If step 404 determines that the current service level is equal to or greater than the service level target, the process moves to step 408, where a determination is made as whether the total number of surplus agents in the small skill group for Skill 22 is at least one more than the specified minimum threshold X, or at least three surplus agents in this example. If not, there are insufficient surplus agents, and the agent is not eligible to help with the large volume skill, as indicated in step 410.

In step 412, a check is made as to whether or not the current service level for Skill 24 is equal to or greater than the 90/10 service level target for Skill 24.

If the current service level for Skill 24 is not equal to or greater than the 90/10 service level target, the agent is not eligible to help with the large volume skill (Skill 1) as indicated in step 414, and hence cannot be borrowed to handle a call requiring the large volume skill.

If step 412 determines that the current service level for Skill 24 is equal to or greater than the 90/10 service level target, the process moves to step 416, where a determination is made as whether the total number of surplus agents in the small skill group for Skill 24 is at least one more than the specified minimum threshold X, or at least four surplus agents in this example. If not, there are insufficient surplus agents, and the agent is not eligible to help with the large volume skill, as indicated in step 414.

Although not shown in the figure, there may be feedback from steps 410 and 414 to step 404, so that the surplus agent determinations of steps 408 and 416, and the service level determination of step 412, if producing a negative result, can be periodically repeated, like the service level determination of step 404.

Thus, if the agent that becomes available cannot be borrowed, that agent may be placed into a pool of available agents. Whenever the service level changes significantly or another agent is added to the available pool, the process steps 404, 408, 412 and 416 can be repeated to determine which of the available agents, if any, can be borrowed.

If the total number of surplus agents in the small skill group for Skill 24 is at least one more than the specified minimum threshold X, that is, if there are four or more surplus agents for Skill 24, the surplus agent with the lowest occupancy is selected to be a borrowable agent for the large skill, as indicated in step 418. Although a LOA selection technique is used in this example, other techniques, such as MIA, or combinations of such techniques, can be used instead. Again, the selection can also or alternatively take into account surplus agent proficiency at the small skill, the large skill, or both. Any combination of such criteria may be used, and the invention is not limited in this regard.

In step 420, a determination is made as to whether there is a call surplus in the large skill, that is, if there are more calls waiting in queue than there are agents available to service the calls. If so, the borrowable small group agent as determined in step 418 is used to handle a call, as indicated in step 422. Otherwise, the borrowable agent determined in step 418 enters the agent queue(s) for both the large skill (Skill 1) and the small skills (Skill 22 and Skill 24). Step 424 indicates that, as a result, the next call when it arrives may be handled by the borrowed agent determined in step 418, or by an agent that has Skill 1 as a primary skill.

As in the FIG. 3 example, the agent selection process in FIG. 4 may be further altered such that it provides additional bias toward using the borrowable agents. For example, the borrowable agent may be used automatically for the next available call, or the use of borrowable and large skill agents may be alternated as long as borrowable agents are available.

It is to be appreciated that the particular settings, processing steps, group types and sizes, and other aspects of the flow diagrams of FIGS. 3 and 4 are presented by way of illustrative example only, and numerous alternative arrangements may be used in implementing the invention. For example, a service level target of 0% in "n" seconds would allow agents to be borrowed regardless of actual service level achievement of the small group skill. Alternatively, the service level target achievement that permits agents to be borrowed may be far lower than the target used in planning and staffing for the small group.

A given embodiment may be configured to provide skill reports or other information that is useful to call center management in characterizing performance of small group borrowing techniques such as those described above.

As a more particular illustration, an occupancy calculation may be performed for small skill agents to show the percentages of occupancy contributed by each large skill they support. In other words, if an agent had an overall 74% occupancy for the day, the system could perform calculations to indicate, for example, that the agent had 58% occupancy based on core work, with 7% added due to Large Skill 1 and 9% added due to Large Skill 2.

Additionally, from the large skill perspective, the call center management might want a skill report indicating, for example, how many calls in any given period of time were handled by borrowed agents. A separate statistic of this type could be incorporated into an otherwise conventional Match Rate statistic that call center management uses to determine what percentage of calls were answered by primary agents versus reserve agents.

The illustrative embodiments described above provide a number of significant advantages over conventional techniques. For example, the described techniques give call centers the ability to utilize smaller pools of agents more productively while still maintaining service level targets for smaller volume skills. By identifying small group agents and defining the number of agents that can be made available by each small skill they hold and the current service level targets of the small skills, small skill agents are able to take calls for larger skills without impacting the small skill service levels. This allows the small skill agents to handle more calls, thereby making them more productive.

It should be understood that the above-described techniques are not limited to use with voice calls, but are instead more generally applicable to any work tasks that arrive from a customer or other entity, e.g., e-mail, fax, text chat, voice over IP, etc., as well as to workflow and/or customer fulfillment generated work tasks that are part of, e.g., a workflow system in which various work tasks dealing with actual or electronic "paperwork," contacts with customers, approvals, etc. that must be completed in order to fulfill a specified customer need.

A call center configured in accordance with the invention may be distributed over multiple sites. For example, the processing operations described above may be performed in a remote or centralized system before a given call or other communication is delivered to an available agent at a particular local site.

It should again be emphasized that the above-described embodiments of the invention are intended to be illustrative only. For example, it should be noted that the exemplary configuration of the call center shown in FIG. 1 may be altered to incorporate a wide variety of different arrangements of components to provide the call processing functions described herein. One such alternative arrangement may be configured such that the processing functions described herein are implemented in a so-called "off-board" server, e.g., a server outside of an ACD system. In this type of arrangement, one or more servers control the distribution of work to agents in an enterprise, such that the processing functions related to distribution can be moved in whole or in part from the ACD system to the servers. The term "call center" as used herein is intended to include these and other alternative systems in which the present invention can be implemented. As another example, the particular relative group sizes can be varied in alternative embodiments. Thus, the invention does not require any particular relative sizes among the various groups in a given embodiment.

It should also be noted that the invention may be implemented in the form of a computer-readable medium or other similar medium containing software which, when executed by a computer or other type of processor, will cause the processor to implement the processing functions described above. For example, the BCMS 110, call vector 140, agent selector 150 and other elements of ACD system 101 may each be implemented at least in part as one or more software programs stored in memory 115 or any other computer readable medium associated with the ACD system 101, and executed by processor 116 or other processing hardware associated with the ACD system 101. A wide variety of alternative arrangements of hardware, software and firmware may be used to provide communication processing operations in accordance with the invention.

These and numerous other alternative embodiments within the scope of the following claims will be apparent to those skilled in the art.

What is claimed is:

1. A computer-implemented method of processing at least one communication in a call center, the call center having a plurality of agents comprising at least a first group associated with a first skill and a second group associated with a second skill, the method comprising the steps of:

determining a number of available agents in the first group upon detecting a service level target for the first skill is met;

selecting at least one agent from the available agents in the first group upon detecting the number of available agents exceeds a minimum available agent requirement; and designating the at least one selected agent as eligible for handling at least one communication involving the second skill while maintaining the at least one selected agent's assignment to the first group currently meeting the service level target for the first skill, wherein detecting the number of available agents exceeds a minimum available agent requirement includes:

identifying that a respective first group agent represents at least a predetermined percentage of all agents currently assigned to the first group;

wherein designating the at least one selected agent as eligible for handling at least one communication involving the second skill includes:

utilizing the respective first group agent to handle at least one communication involving the second skill due to the respective first group agent being representative of at least the predetermined percentage of all agents currently assigned to the first group, wherein the second group includes more agents than the first group.

2. The method of claim 1 wherein a given one of the plurality of agents has a plurality of skills selected from a first set of skills including the first skill and one or more additional skills.

3. The method of claim 1 wherein a given one of the plurality of agents may be designated as eligible for handling a communication involving any of a plurality of skills from a second set of skills including the second skill and one or more additional skills from said second set of skills.

4. The method of claim 1 wherein the agent designated as eligible for handling a communication involving the second skill is given priority over one or more of the agents in the second group in a selection process which determines a particular agent to handle the communication.

5. The method of claim 1 further including the step of generating information indicative of a portion of occupancy of a given agent of the first group that is attributable to handling of communications involving the second skill.

6. The method of claim 1 further including the step of generating information indicative of a number of communications involving the second skill which are handled within a given period of time by agents of the first group.

7. The method of claim 1 wherein the step of determining if a service level target for the first skill is being met further comprises the step of determining if a designated percentage of communications involving the first skill are being handled by the agents of the first group within a specified period of time.

8. The method of claim 1 wherein the step of determining if a number of available agents in the first group exceeds a specified minimum available agent requirement further comprises determining if there is at least one more than a specified minimum number of available agents in the first group.

9. The method of claim 1 wherein the step of determining if a number of available agents in the first group exceeds a specified minimum available agent requirement further comprises determining if the number of available agents in the first group represents more than a specified percentage of the total number of agents in the first group.

10. The method of claim 1 wherein the step of selecting at least one of the available agents in the first group and designating that agent as eligible for handling a communication involving the second skill further comprises selecting the agent utilizing one or more of the following selection criteria: (i) occupancy levels of the available agents; (ii) idle time of the available agents; (iii) proficiency of the available agents at the first skill; and (iv) proficiency of the available agents at the second skill.

11. The method of claim 1 wherein the plurality of agents comprises at least three groups including the first and second groups and a third group, the second group also having a larger number of agents than the third group, such that the first and third groups represent respective small groups relative to the second group which represents a large group.

12. The method of claim 11 wherein a given agent in both the first group and the third group cannot be designated as eligible for handling a communication involving the second skill unless service level targets are being met for both the first group and the third group and numbers of available agents in the first and third groups exceed respective specified minimum available agent requirements.

13. The method of claim 1 wherein if one or more communications requiring the second skill are waiting in a queue in the call center, the agent designated as eligible for handling a communication involving the second skill is immediately assigned to handle a particular one of said communications.

14. The method of claim 1 wherein if there are no communications requiring the second skill currently waiting in a queue in the call center, the agent designated as eligible for handling a communication involving the second skill is considered with the agents of the second group for selection to handle a given arriving communication requiring the second skill.

15. The method of claim 1 wherein the specified minimum available agent requirement is determined by a value entered in a hunt group form associated with a call administration process of the call center.

16. The method of claim 1 further comprising periodically repeating the determining steps if in a given iteration of said steps at least one of said steps results in a negative determination.

17. The method of claim 1 wherein the second skill for which a given agent in the first group may be considered is specified in an agent administration form of the call center.

18. The method of claim 1 wherein the service level target may be set at least temporarily to a value that ensures the service level target will be automatically met.

19. The method of claim 1 wherein the determining and selecting steps are implemented at least in part in software running on a processor of a processing device in the call center.

20. An apparatus for processing communications in a call center, the call center having a plurality of agents comprising at least a first group associated with a first skill and a second group associated with a second skill, the apparatus comprising:

a memory for storing information regarding a service level target for the first skill and a specified minimum available agent requirement for the first group; and a processor coupled to the memory and operative to:

determine a number of available agents in the first group upon detecting a service level target for the first skill is met;

select at least one agent from the available agents in the first group upon detecting a the number of available agents exceeds a minimum available agent requirement; and designate the at least one selected agent as eligible for handling at least one communication involving the second skill while maintaining the at least one selected agent's assignment to the first group currently meeting the service level target for the first skill, wherein detecting the number of available agents exceeds a minimum available agent requirement includes:

identifying that a respective first group agent represents at least a predetermined percentage of all agents currently assigned to the first group;

wherein designating the at least one selected agent as eligible for handling at least one communication involving the second skill includes:

utilizing the respective first group agent to handle at least one communication involving the second skill due to the respective first group agent being representative of at least the predetermined percentage of all agents currently assigned to the first group, wherein the second group includes more agents than the first group.

21. A computer system comprising:

a processor;

a memory unit that stores instructions associated with an application executed by the processor; and an interconnect coupling the processor and the memory unit, enabling the computer system to execute the application and perform at least one operation for processing at least one communication in a call center, the call center having a plurality of agents comprising at least a first group associated with a first skill and a second group associated with a second skill, wherein the at least one operation comprises:

determining a number of available agents in the first group upon detecting a service level target for the first skill is met;

selecting at least one agent from the available agents in the first group upon detecting a the number of available agents exceeds a minimum available agent requirement; and designating the at least one selected agent as eligible for handling at least one communication involving the second skill while maintaining the at least one selected agent's assignment to the first group currently meeting the service level target for the first skill, wherein detecting the number of available agents exceeds a minimum available agent requirement includes:

identifying that a respective first group agent represents at least a predetermined percentage of all agents currently assigned to the first group;

wherein designating the at least one selected agent as eligible for handling at least one communication involving the second skill includes:

utilizing the respective first group agent to handle at least one communication involving the second skill due to the respective first group agent being representative of at least the predetermined percentage of all agents currently assigned to the first group, wherein the second group includes more agents than the first group.

\* \* \* \* \*